No. 763,495. PATENTED JUNE 28, 1904.
J. A. LITTLE.
ELECTRIC LIGHTING SYSTEM FOR VEHICLES.
APPLICATION FILED OCT. 3, 1903.
NO MODEL. 2 SHEETS—SHEET 1.
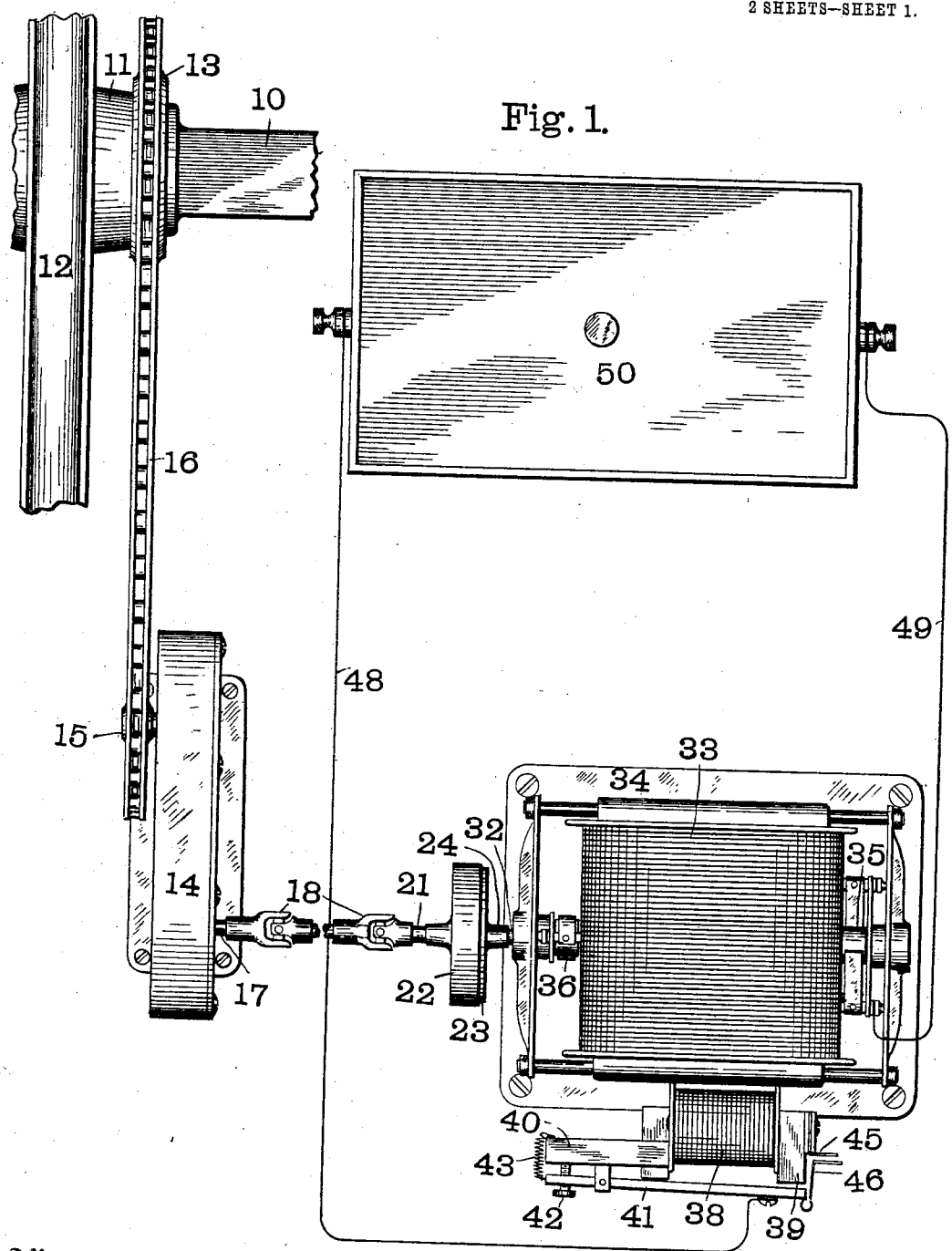
Witnesses
W. A. Alexander
D. C. Betjeman
Inventor
John A. Little
By Attorneys No. 763,495. PATENTED JUNE 28, 1904.
J. A. LITTLE.
ELECTRIC LIGHTING SYSTEM FOR VEHICLES.
APPLICATION FILED OCT. 3, 1903.
NO MODEL. 2 SHEETS—SHEET 2.
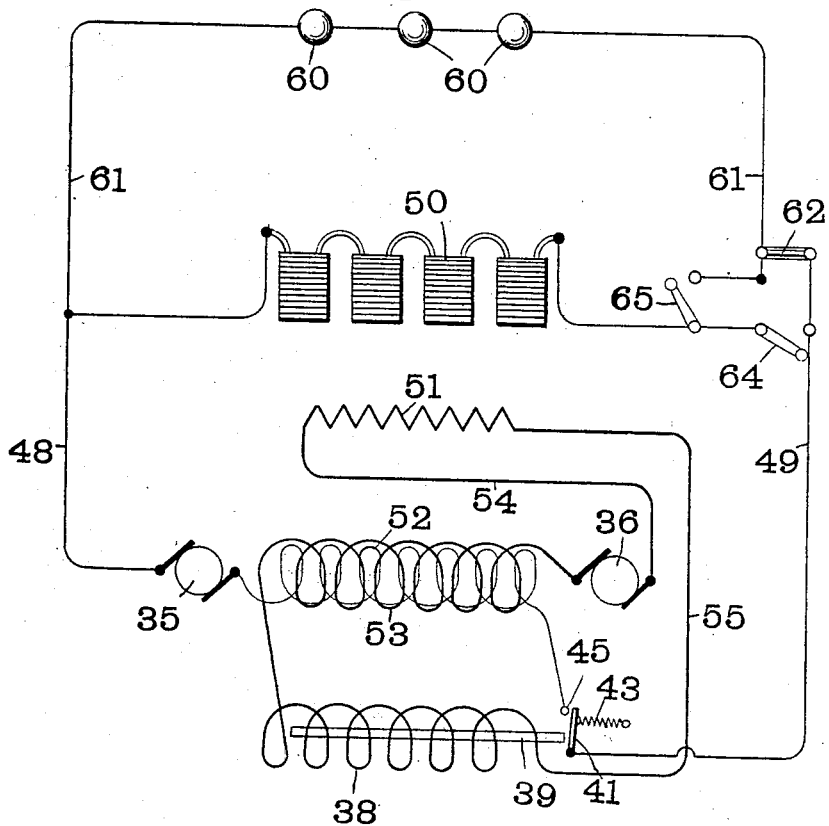
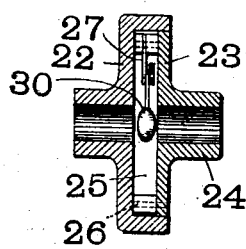
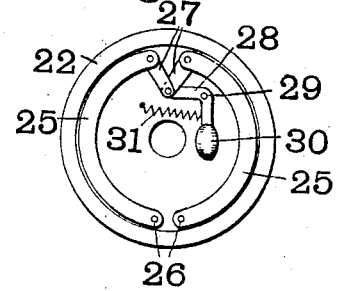
Witnesses
W. A. Alexander
D. C. Betjeman
Inventor
John A. Little
By Attorneys
Howln H Bryson No. 763,495.

Patented June 28, 1904.

UNITED STATES PATENT OFFICE.

JOHN A. LITTLE, OF ST. LOUIS, MISSOURI, ASSIGNOR TO THE GLOBE ELECTRIC COMPANY, OF ST. LOUIS, MISSOURI, A CORPORATION OF MISSOURI.

ELECTRIC-LIGHTING SYSTEM FOR VEHICLES.

SPECIFICATION forming part of Letters Patent No. 763,495, dated June 28, 1904.

Application filed October 3, 1903. Serial No. 175,626. (No model.)

*To all whom it may concern:*

Be it known that I, JOHN A. LITTLE, a citizen of the United States, residing at the city of St. Louis, in the State of Missouri, have invented a certain new and useful Electric-Lighting System for Vehicles, of which the following is such a full, clear, and exact description as will enable any one skilled in the art to which it appertains to make and use the same, reference being had to the accompanying drawings, forming part of this specification.

My invention relates more particularly to an electric-lighting system for vehicles in which the dynamo is driven from the running-gear of the vehicle, and has for its object to produce such a system as will furnish the requisite amount of light with a minimum expenditure of power.

In the drawings, in which like characters refer to similar parts of the different views, Figure 1 is a bottom plan view of my apparatus as applied to a vehicle. Fig. 2 is a diagram of the circuits. Fig. 3 is a vertical central section of the friction-clutch, and Fig. 4 is a side view of the same with one of the parts removed.

Referring first to Fig. 1, 10 indicates the axle of the vehicle, 11 the hub, and 12 the rim or tire of the wheel. 13 is a gear-wheel fastened upon the hub 11. 14 is a gear-casing suitably fastened upon the bottom of the vehicle. This gear-casing has journaled in it a gear-wheel 15. A chain 16 connects the gear-wheels 13 and 15. The gear-casing 14 contains suitable gear for driving the shaft 17 at a high rate of speed from the rotation of the hub 11. The shaft 17 carries one member of a universal joint 18, the other member of which is fastened to a shaft 21, which carries upon it an annular member 22, forming part of the friction-clutch. This friction-clutch is shown in detail in Figs. 3 and 4. The opening in the annular member 22 is closed by an annular flange 23, carried by a hub 24. 25 indicates segmental members pivoted at their lower ends, as indicated at 26, to the inner side of the flange 23. Pivoted at the upper end of the members 25 are links 27, pivoted at their lower ends to one end of a bent lever 28, which in turn is pivoted at 29 to the inner face of the flange 23 and carries at its lower end a weight 30. The spring 31, fastened to the lever 28 and to the inner face of the flange 23, serves to hold the parts when stationary so that the outer surface of the segmental members 25 are in contact with the inner surface of the annular member 22. The hub 24 is secured to the armature-shaft 32 of a dynamo 33, suitably fastened by means of a frame 34 to the bottom of the vehicle. This dynamo is provided with two commutators, one at each end, as shown at 35 and 36, for a purpose hereinafter to be described. It also carries at one side an electromagnet 38, forming part of an interrupter. This magnet 38 is provided with pole-pieces 39, one of which carries a support 40, to which is pivoted the armature of the magnet 41. A thumb-screw 42 serves to regulate the position of the armature, and a spring 43 is provided to hold the armature normally away from the pole-pieces 39, as shown in Fig. 1. One of the pole-pieces is also provided with a contact 45, and a similar contact 46 is carried by the end of the armature 41. 48 and 49 are conductors connecting the dynamo with a storage battery 50.

The electrical connections of the dynamo with the battery and lights are shown in diagram in Fig. 2. In this figure, 51 indicates the field-coils of the dynamo. The armature of the dynamo is provided with two windings, one winding, 52, being connected through the commutator 35 with a wire 48, leading to the battery, and at its other end through the interrupter with a wire 49, also leading to the battery. The other winding, 53, of the armature is connected at one end with the electromagnet 38 and at the other end through the commutator 36 by means of the wire 54 with the field 51. The opposite end of the electromagnet 38 is connected, by means of a wire 55, with the remaining end of the field-winding 51. It will thus be seen that the field-winding 51 and the electromagnet 38 are connected in series with the armature-winding 53. 60 represents incandescent lamps, which are connected by means of wires 61 with the wires 48 and 49. A switch 62 is provided for making and breaking the circuit from the armature-winding 52 through the lamps 60. The battery 50 is connected permanently at one end to the wire 48 and at the other end is adapted to be connected at will to the wire 49 by means of a switch 64. Another switch, 65, is adapted to connect the battery through the wires 61 with the lamps 60.

In the operation of my invention it will be evident that the rotation of the hub 11 will cause the member 22 of the friction-clutch to rotate also. The members 25, pivoted to the flange 23, being in contact at starting with the inner surface of the member 22 and the armature-shaft 32, to which the member 23 is fastened, will also be rotated, and current will thus be generated in the armature-windings 52 and 53. As soon as the current in the armature-winding 52 becomes sufficiently strong the armature 41 of the interrupter will be drawn down by the current flowing in the coil 48, which is connected with the armature-winding 52, so that the contact 46 will meet the contact 45, thus closing the circuit through the battery or the lamps or both the battery and the lamps at the same time, as hereinafter described. It is evident that when the rotation of the friction-clutch reaches a certain limit the centrifugal force thereby generated will swing the weight 30 outward on the pivot 29, thus withdrawing the members 25 from contact with the member 22 and serving to keep the rotation of the armature constant at the requisite speed, but not allowing it to exceed such speed. It is evident that with the switches 62, 64, and 65 in the positions shown in the diagram of Fig. 2 the battery 50 will be cut out of circuit and the lamps 60 will be fed with current from the armature-winding 53, so that when the vehicle is moving the battery will furnish no current to the lamps. If now we close the switch 64, the battery will be connected in the circuit in multiple with the lamps and the surplus current not used for the lamps will be employed to charge the battery. If now we open the switch 62 and close the switch 65, the switch 64 being also open, it is evident that the battery will be employed to supply current to the lamps 60, thus enabling the lamps to be kept lighted when the vehicle is stationary and the dynamo not in operation. When the vehicle stops, it will be evident that the cessation of current in the armature-winding 52 will allow the spring 43 to draw back the magnet-armature 41, thus breaking the circuit from the dynamo-winding through the lamps. In practice I so proportion the parts of this system that the circuit through the lamps and the battery will not be completed by the automatic interrupter until the voltage of the dynamo-winding supplying current to the lamps and battery exceeds the voltage of the battery. When the vehicle is stopped and the voltage of the armature-windings supplying the lamps and battery falls to approximately the voltage of the battery, the circuit is again broken by the automatic interrupter, thus preventing the battery from discharging back through the armature-winding in case it should be connected in the circuit when the voltage of the armature-winding is below the voltage of the battery.

Having fully described my invention, what I claim as new, and desire to secure by Letters Patent of the United States, is—

1. The combination with a dynamo-electric machine the armature of which comprises a plurality of circuits, of an electric battery energized from one of said circuits, and electromagnetic means energized from another of said circuits for controlling the flow of current through said battery.

2. The combination, with a dynamo-electric machine the armature of which comprises a plurality of circuits, of an electric battery and a translating device energized from one of said circuits, and electromagnetic means energized from another of said circuits for controlling the flow of current through said battery.

3. The combination, with a dynamo-electric machine the armature of which comprises a plurality of circuits, of a battery and a translating device energized from one of said circuits, and electromagnetic means energized from the other of said circuits for controlling the flow of current through said battery and translating device.

4 The combination with a dynamo-electric machine, the armature of which is provided with two independent windings, of a separate commutator for each of said windings, an electric battery, a circuit conducting current from one of said windings to said battery, and electromagnetic means energized from the other of said windings for opening and closing said circuit.

5. The combination with an armature provided with a plurality of circuits, of an electric battery energized from one of said circuits, a field-coil energized from another of said circuits, and electromagnetic means energized from said last-named circuit for controlling the flow of current through said battery.

6. The combination, with a dynamo-electric machine the armature of which comprises a plurality of circuits, of an electric battery and a translating device energized from one of said circuits, a field-coil energized from another of said circuits, and electromagnetic means energized from said last-named circuit for controlling the flow of current through said battery and translating device.

In testimony whereof I have hereunto set my hand and affixed my seal in the presence of the two subscribing witnesses.

JOHN A. LITTLE. [L. S.]

Witnesses:
 GEO. A. CLARK,
 J. H. BRYSON.